United States Patent
Iwase et al.

(10) Patent No.: US 9,896,084 B2
(45) Date of Patent: Feb. 20, 2018

(54) CONTROL SYSTEM FOR HYBRID VEHICLE

(71) Applicant: Toyota Jidosha Kabushiki Kaisha, Toyota-shi (JP)

(72) Inventors: Yuji Iwase, Mishima (JP); Takahito Endo, Sunto-gun (JP); Kensei Hata, Sunto-gun (JP); Shotaro Kato, Susono (JP); Hidekazu Nagai, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/273,003

(22) Filed: Sep. 22, 2016

(65) Prior Publication Data
US 2017/0106851 A1 Apr. 20, 2017

(30) Foreign Application Priority Data
Oct. 16, 2015 (JP) .................. 2015-204319

(51) Int. Cl.
| B60W 20/00 | (2016.01) |
|---|---|
| B60W 10/00 | (2006.01) |
| B60K 6/00 | (2006.01) |
| B60W 20/10 | (2016.01) |
| B60K 6/365 | (2007.10) |
| B60K 6/387 | (2007.10) |

(Continued)

(52) U.S. Cl.
CPC .............. *B60W 20/10* (2013.01); *B60K 6/365* (2013.01); *B60K 6/387* (2013.01); *B60K 6/405* (2013.01); *B60W 10/02* (2013.01); *B60W 10/06* (2013.01); *B60W 10/08* (2013.01); *B60W 10/196* (2013.01); *B60K 2006/268* (2013.01); *B60W 2510/0638* (2013.01); *B60W 2710/027* (2013.01); *B60W 2710/08* (2013.01); *B60W 2710/18* (2013.01); *B60Y 2200/92* (2013.01); *B60Y 2300/192* (2013.01); *B60Y 2400/42* (2013.01); *B60Y 2400/73* (2013.01); *Y10S 903/911* (2013.01); *Y10S 903/914* (2013.01); *Y10S 903/93* (2013.01); *Y10S 903/952* (2013.01)

(58) Field of Classification Search
CPC ......... B60W 20/00; B60W 20/10; G60K 6/00
See application file for complete search history.

(56) References Cited

U.S. PATENT DOCUMENTS

| 5,722,502 A * | 3/1998 | Kubo ..................... B60K 6/442 |
|---|---|---|
| | | 180/65.23 |
| 6,380,640 B1 * | 4/2002 | Kanamori ................ B60K 1/02 |
| | | 290/40 C |

(Continued)

FOREIGN PATENT DOCUMENTS

JP 2013-56600 3/2013

*Primary Examiner* — Yonel Beaulieu
(74) *Attorney, Agent, or Firm* — Oblon, McClelland, Maier & Neustadt, L.L.P.

(57) ABSTRACT

A control system for a hybrid vehicle to start an engine without causing a torque drop is provided. A combined planetary gear unit is configured in such a manner that an input element connected to the engine and an output element are situated between a reaction element connected to a first motor and a fixed element connected to a brake in a nomographic diagram. The first motor is selectively connected to the engine by a clutch. A controller is configured to start the engine by the first motor while engaging the brake to restrict rotation of the fixed element and engaging the clutch.

11 Claims, 8 Drawing Sheets

(51) Int. Cl.
*B60K 6/405* (2007.10)
*B60W 10/02* (2006.01)
*B60W 10/06* (2006.01)
*B60W 10/08* (2006.01)
*B60W 10/196* (2012.01)
*B60K 6/26* (2007.10)

(56) References Cited

U.S. PATENT DOCUMENTS

| | | | | |
|---|---|---|---|---|
| 8,579,748 | B2* | 11/2013 | Kawasaki | B60K 6/48 |
| | | | | 180/53.5 |
| 9,731,703 | B2* | 8/2017 | Message | B60W 20/10 |
| 2010/0273605 | A1* | 10/2010 | Kawasaki | B60K 6/48 |
| | | | | 477/20 |

* cited by examiner

CONTROL SYSTEM FOR HYBRID VEHICLE

CROSS REFERENCE TO RELATED APPLICATIONS

The present application claims the benefit of priority to Japanese Patent Application No. 2015-204319 filed on Oct. 16, 2015 with the Japanese Patent Office, the entire contents of which are incorporated herein by reference in its entirety.

BACKGROUND

Field of the Disclosure

Embodiments of the present application relates to the art of a control system for a hybrid vehicle in which a prime mover includes an engine and two motors, and especially to a control system configured to startup an engine during propelling a vehicle by a motor while stopping an engine.

Discussion of the Related Art

A hybrid vehicle can be powered only by a motor when a required driving force is small. In the hybrid vehicle of this kind, an engine is started when an accelerator pedal is depressed deeply to increase a drive force during propelling the vehicle by the motor. In this situation, the engine is started by one of the motors as a prime mover. JP-A-2013-56600 describes an engine start control device configured to start an engine by a motor being used to power a vehicle.

According to the teachings of JP-A-2013-56600, the engine is connected to a carrier of a planetary gear unit, and a reverse rotation of the carrier is prevented by a one-way clutch. A first motor is connected to a sun gear of the planetary gear unit, and a second motor is connected to a ring gear connected to an output member to apply torque to the output member. In a nomographic diagram of this planetary gear unit, the carrier connected to the engine is situated between the sun gear connected to the engine and the ring gear to which the torque of the second motor is applied. Since the reverse rotation of the carrier can be stopped by the one-way clutch, the ring gear or the output member connected to thereto is rotated in the forward direction by applying a reverse torque of the first motor to the sun gear. In this situation, the vehicle can be propelled in a dual-motor mode in which the vehicle powered by the first motor and the second motor by rotating the second motor in the forward direction.

When starting the engine in the hybrid vehicle taught by JP-A-2013-56600 during propulsion in the dual-motor mode, the control device brings a brake device into engagement to deliver the forward torque to the carrier while controlling the first motor to generate the reverse torque. Specifically, the brake device is arranged in such a manner as to be situated between the sun gear and the carrier in the nomographic diagram of the planetary gear unit. According to the teachings of JP-A-2013-56600, therefore, the brake device is allowed to serve as a reaction element instead of the one-way clutch receiving the reverse torque of the first motor to startup the engine connected to the carrier by the forward torque.

According to the teachings of JP-A-2013-56600, the first motor is rotated in the same direction during propulsion in the dual-motor mode and when starting the engine. That is, a drive force generated by the first motor will not be dropped to zero even temporarily. However, as indicated in nomographic diagrams of JP-A-2013-56600, torque multiplication of a case in which the brake device establishes a reaction torque against the reverse torque of the first motor may be reduced in comparison with torque multiplication of a case in which the one-way clutch establishes a reaction torque against the reverse torque of the first motor. As a result, temporal drop in the drive force and shocks may be caused. Specifically, the torque multiplication is a ratio of an output torque of the first motor to a torque applied to the ring gear in the forward direction. In order to apply the torque to the carrier in the forward direction, the brake device has to be situated between the sun gear and the ring gear in the nomographic diagram. Consequently, a distance between the sun gear and the brake becomes shorter than that between the sun gear and the carrier in the nomographic diagram. For this reason, the torque multiplication may be reduced during applying the output torque of the first motor to the ring gear thereby causing a drop in the drive torque generated by the first motor.

SUMMARY

Aspects of the present invention have been conceived noting the foregoing technical problems, and it is therefore an object of the present application is to provide a control system for a hybrid vehicle configured to prevent a drop in drive torque when starting an engine during propulsion in the motor mode.

The control system according to the embodiment of the present application is applied to a hybrid vehicle comprising an engine, a first motor, a power distribution device connected to the engine and the first motor, an output member to which torque is delivered from the power distribution device, and a second motor connected to the output member. In the hybrid vehicle, the power distribution device includes a combined planetary gear unit formed by combining a first planetary gear unit and a second planetary gear unit. A rotary element of the combined planetary gear unit includes a reaction element connected to the first motor, a fixed element whose rotation is selectively restricted, an input element connected to the engine, and an output element connected to the output member. The combined planetary gear unit is configured in such a manner that the reaction element is rotated at a speed higher than speeds of the input element and the output element when rotation of the fixed element is restricted, and that the fixed element is rotated at a speed higher than speed of the input element and the output element when the fixed element is allowed to rotate and the reaction element is rotated at a speed lower than the speeds of the input element and the output element. In addition, a clutch is disposed between any of the rotary elements the combined planetary gear unit or between the input element and the engine to selectively transmitting torque between the first motor and the engine. The control system is provided with a controller for controlling startup of the engine, and the controller is configured to start the stopping engine by operating the first motor to generate torque for rotating the engine while restricting rotation of the fixed element and increasing a torque transmitting capacity of the clutch.

In a non-limiting embodiment, the hybrid vehicle may further comprise a brake that selectively restricts rotation of the fixed element, and the controller may be further configured to restrict rotation of the fixed element by the brake when starting the engine.

In a non-limiting embodiment, the hybrid vehicle may further comprises a casing holding the combined planetary gear unit. In addition, the first planetary gear unit may comprise the reaction element, the output element, and the fixed element, the second planetary gear unit may comprise the input element, a first rotary element, and a second rotary element connected to the reaction element. In this case, the fixed element may be connected to the casing in such a manner as to restrict rotation of the fixed element, and the clutch may be disposed between the first rotary element and the fixed element.

In a non-limiting embodiment, the first planetary gear unit may comprise the reaction element, the output element, and the fixed element, and the second planetary gear unit may comprises the input element, a first rotary element, and a second rotary element connected to the reaction element. In this case, the clutch may be disposed between the first rotary element and the output element.

In a non-limiting embodiment, the first planetary gear unit may comprise the reaction element, the input element, and a third element, and the second planetary gear unit may comprises the fixed element, the output element, and a fourth rotary element. In this case, the third rotary element may be connected to the fixed element, and the fourth rotary element is connected to the input element, and the clutch may be disposed between the input element and the engine.

In a non-limiting embodiment, the controller may be further configured to: determine whether or not an expected engine speed to be achieved by engaging the clutch is higher than a threshold value; start the engine by a torque of the first motor while engaging the clutch and halting rotation of the fixed element in a case that the expected engine speed is higher than the threshold value; and start the engine by a torque of the first motor while reducing a torque transmitting capacity of the brake to allow the fixed element to rotate in a counter direction to a rotational direction of the reaction element and engaging the clutch, in a case that the expected engine speed is lower than the threshold value.

In a non-limiting embodiment, the controller may be further configured to adjust the expected engine speed by increasing a rotational speed of the reaction element by the first motor, in a case of allowing the fixed element to rotate in the counter direction to the rotational direction of the reaction element by reducing the torque transmitting capacity of the brake.

In a non-limiting embodiment, the controller may be further configured to execute at least any one of a control to increase the torque transmitting capacity of the brake and a control to restrict an increase in a torque transmitting capacity of the clutch, in a case that the expected engine speed is raised to be higher than an upper limit value by reducing the torque transmitting capacity of the brake.

In a non-limiting embodiment, the controller may be further configured to: increase the torque transmitting capacity of the brake in a case that a speed difference between rotary members of the brake is equal to or greater than a first allowable value; and restrict the torque transmitting capacity of the clutch in a case that a speed difference between rotary members of the clutch is smaller than a second allowable value.

In a non-limiting embodiment, the controller may be further configured to adjust both of the torque transmitting capacities of the brake and the clutch in a case that the speed difference between rotary members of the brake is equal to or greater than the first allowable value and speed difference between rotary members of the clutch is greater than the second allowable value.

Thus, according to the embodiment of the present application, the output element or the output member is rotated by the torque of the first motor while restricting rotation of the fixed element, and torque transmission between the first motor and the engine is interrupted by disengaging the clutch to keep stopping the engine. In this situation, the engine can be started by increasing a torque transmitting capacity of the clutch. According to the embodiment, a torque transmitting route from the first motor to the engine, and multiplication of the torque applied to the output element will not be changed during motoring of the engine. That is, the engine can be started without reducing multiplication of the torque of the first motor. For this reason, temporal drop in the drive torque can be prevented during starting the engine by the first motor.

As described, the controller is configured to determine the expected engine speed to be achieved by engaging the clutch. If the expected engine speed is lower than the threshold value, the fixed element is allowed to rotate in the counter direction by reducing a torque transmitting capacity of the brake. Consequently, engine speed is raised to an ignition speed or a self-sustaining speed by engaging the clutch so that the engine can be started certainly.

In addition, if the expected engine speed is raised to be higher than the upper limit value as a result of reducing the torque transmitting capacity of the brake, the torque transmitting capacity of the brake is increased or an increase in the torque transmitting capacity of the clutch is restricted. For this reason, the engine speed can be prevented from being raised excessively by the first motor.

In this case, torque transmitting capacities of the brake and the clutch are adjusted to avoid excessive slip of the brake and the clutch. For this reason, heat generation and damage on the brake and the clutch can be limited.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
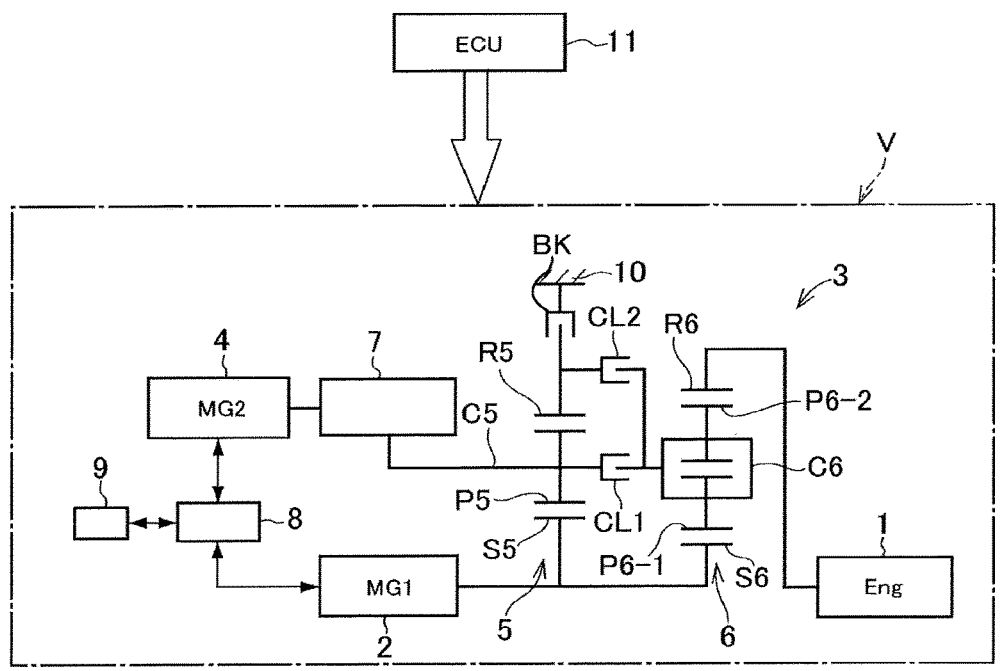
FIG. 1 is a schematic diagram showing first example of a powertrain of the hybrid vehicle to which the control system according to the embodiment is applied.

Preferred embodiments of the present application will now be explained with reference to the accompanying drawings. Referring now to FIG. 1, there is shown the first example of a powertrain of a hybrid vehicle (as will be simply called the "vehicle" hereinafter) V to which the control system according to the embodiment is applied. The powertrain is provided with an engine (referred to as "Eng" in the figures) 1 such as a gasoline engine and a diesel engine, a first motor (referred to as "MG1" in the FIG. 2 as a motor-generator, a power distribution device 3 connected to the engine 1 and the first motor 2, and a second motor (referred to as "MG2" in the FIG. 2 as a motor-generator. An output torque of the second motor 4 can be added to an output torque of the power distribution device 3. Specifically, the power distribution device 3 is a combined planetary gear unit formed by combining a single-pinion planetary gear unit 5 as a first planetary gear unit (or a rear planetary gear unit) with a double-pinion planetary gear unit 6 as a second planetary gear unit (or a front planetary gear unit).

The first planetary gear unit 5 is adapted to perform a differential action among a sun gear S5, a ring gear R5 as an internal gear arranged concentrically with the sun gear S5, and a carrier C5 supporting pinion gears P5 interposed between the sun gear S5 and the ring gear R5 in a rotatable and revolvable manner. On the other hand, the second planetary gear unit 6 comprises a sun gear S6, a ring gear R6 as an internal gear arranged concentrically with the sun gear S6, first pinion gears $P6_{-1}$ meshing with the sun gear S6, second pinion gears $P6_{-2}$ interposed between the first pinion gears $P6_{-1}$ and the ring gear R6, and a carrier C6 supporting the first pinion gears $P6_{-1}$ and the second pinion gears $P6_{-2}$ in a rotatable and revolvable manner. The second planetary gear unit 6 is also adapted to perform a differential action among the sun gear S6, the ring gear R6, and the carrier C6.

The first planetary gear unit 5 and the second planetary gear unit 6 is disposed coaxially while being adjacent to each other so that the sun gear S5 and the sun gear S6 are rotated integrally. The first motor 2 is connected individually to the sun gear S5 and the sun gear S6 so that the sun gear S5 of the first planetary gear unit 5 serves as a reaction element in the power distribution device 3. The engine 1 is connected to the ring gear R6 of the second planetary gear unit 6 so that the ring gear R6 serves as an input element of the power distribution device 3. The carrier C5 of the first planetary gear unit 5 is connected to an output member 7 such as an output gear and an output shaft so that the carrier C5 serves as an output element of the power distribution device 3. As described, an output torque of the second motor 4 can be applied to the output member 7.

For example, a permanent magnet synchronous motor may be used as the first motor 2 and the second motor 4, and both of the first motor 2 and the second motor 4 are connected to a battery 9 connected to an inverter 8. That is, one of the motors 2 and 4 may be driven by an electric power generated by the other motor 2 or 4. The first motor 2 and the second motor 4 may also be driven by an electric power supplied from the battery 9, and the battery 9 may be charged with electric powers generated by the first motor 2 and the second motor 4.

In order to halt a rotation of the ring gear R5 of the first planetary gear unit 5, a brake BK is disposed between the ring gear R5 and a casing 10 holding the motors 2 and 4 and the power distribution device 3 etc. For example, a frictional engagement device may be used as the brake BK, and a torque transmitting capacity of the brake BK is changed steplessly by hydraulically or electromagnetically changing an engagement pressure. Accordingly, the ring gear R5 serves as a fixed element of the power distribution device 3.

The carrier C5 of the first planetary gear unit 5 is connected selectively to the carrier C6 of the second planetary gear unit 6 through a first clutch CL1, and the ring gear R5 of the first planetary gear unit 5 is also connected selectively to the carrier C6 through a second clutch CL2. The frictional engagement device may also be used as the first clutch CL1 and the second clutch CL2 so that a torque transmitting capacity of each clutch CL1 and CL2 can be changed steplessly by hydraulically or electromagnetically changing an engagement pressure applied thereto. That is, when both of the first clutch CL1 and the second clutch CL2 are disengaged, a reaction torque is no longer applied to the carrier C6 of the second planetary gear unit 6 so that the carrier C6 is allowed to rotate freely. In this situation, a torque transmission is accomplished between the first motor 1 and the engine 1 through the power distribution device 3 by engaging any one of the first clutch CL1 and the second clutch CL2. Accordingly, the first clutch CL1 and the second clutch CL2 serve as the clutch device of the embodiment.

An operating mode of the vehicle V may be selected from a hybrid mode (to be abbreviated as the "HV mode" hereinafter) in which the vehicle V is powered by the engine 1, and a motor mode in which the vehicle V is propelled by operating the first motor 2 and the second motor 4 by the electric power supplied from the battery 9. In order to electrically control the vehicle V, the vehicle V is provided with an electronic control unit (to be abbreviated as the "ECU" hereinafter) 11 as a controller. The ECU 11 is composed mainly of a microcomputer configured to carry out a calculation based on incident data, stored data and stored programs, and transmit a calculation result in the form of command signal. To this end, a vehicle speed, a depression of an accelerator pedal, a state of charge (to be abbreviated as the "SOC" hereinafter) and so on are sent to the ECU 11, and maps determining the operating mode and optimally fuel efficient points of the engine 1 and so on are installed in the ECU 11. Specifically, the ECU 11 transmits command signals for starting and stopping the engine 1, command signals for operating the motors 2 and 4 as motors and generators, command signals for engaging and disengaging the clutches CL1 and CL2, command signals for controlling torque transmitting capacities of the clutches CL1 and CL2 and so on.

Figure 2A:
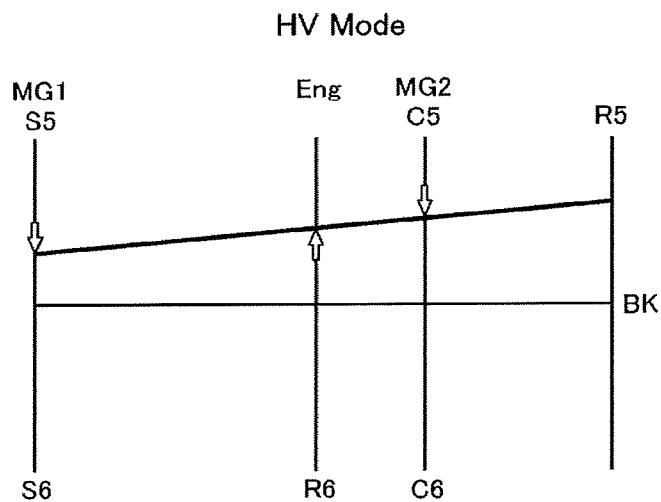
FIGS. 2A and 2B are nomograhic diagrams of a power distribution device (i.e., a combined planetary gear unit) of the powertrain shown in FIG. 1.
Figure 2B:
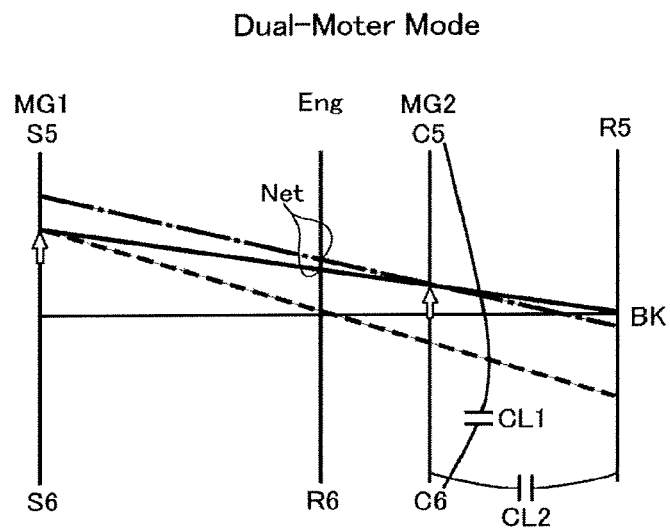

Turning to FIGS. 2A and 2B, there are shown nomographic diagrams showing rotational speeds of rotary elements of the power distribution device 3 in the HV mode and in a dual-motor mode. In the nomographic diagrams, each vertical line individually represents a rotational speed of the rotary element from a horizontal base line representing zero, and each distance between the vertical lines indicates gear ratios of the first planetary gear unit 5 and the second planetary gear unit 6 (i.e., ratio between teeth number of the sun gear and teeth number of the ring gear). Specifically, in the nomographic diagrams shown in FIGS. 2A and 2B, the vertical lines representing the sun gear S5, the carrier C5 and the ring gear R5 of the first planetary gear unit 5 as a single-pinion planetary gear unit are situated in order from the left. As to the rotary elements of the second planetary gear unit 6 as a double-pinion planetary gear unit, the sun gear S6 shares the common vertical line with the sun gear S5, and the vertical line representing the ring gear R6 is situated between the vertical line representing the sun gear S5 and the line representing the carrier C5. Given that the first clutch CL1 is in engagement, the carrier C6 shares the common vertical line with the carrier C5. By contrast, given that the second clutch CL2 is in engagement, the carrier C6 shares the common vertical line with the ring gear R6. Thus, the power distribution device 3 as a combined planetary gear unit is configured in such a manner that the vertical line representing the input element and the vertical line representing the output element are situated between the vertical line representing the reaction element and the vertical line representing the fixed element in the nomographic diagram FIG. 2A indicates a situation of the power distribution device 3 in the HV mode in which the brake BK is disengaged, the first clutch CL1 or the second clutch CL2 is engaged, and the vehicle V is powered by the engine 1. In this situation, the first motor 2 is operated as a generator to generate a negative torque (i.e., a torque in a direction opposite to a rotational direction of the engine 1). An electric power generated by the first motor 2 is supplied to the second motor 4 to operate the second motor 4 to generate a drive torque, and the drive torque generated by the second motor 4 is applied to the output member 7. Specifically, as indicated by arrows in FIG. 2A, the ring gear R6 of the second planetary gear unit 6 is rotated in the forward direction by the output torque of the engine 1, and the sun gear S5 of the first planetary gear unit 5 is also rotated in the forward direction while being subjected to the negative torque of the first motor 2. Consequently, the ring gear R5 and the carrier C5 of the first planetary gear unit 5 and the carrier C6 of the second planetary gear unit 6 are rotated in the forward direction by the torques of the engine 1 and the first motor 2. In this situation, a rotational speed of the engine 1 is adjusted to an optimally fuel efficient manner by the first motor 2.

In this case, given that the first clutch CL1 is in engagement and the second clutch CL2 is in disengagement, the ring gear R5 of the first planetary gear unit 5 is not subjected to tuque so that torque of the carrier C6 of the second planetary gear unit 6 is delivered to the carrier C5 of the first planetary gear unit 5 as the output element through the first clutch CL1, and further delivered to the output member 7. Consequently, the carrier C5 and the carrier C6 are rotated at the same speed. By contrast, given that the second clutch CL2 is in engagement and the first clutch CL1 is in disengagement, the ring gear R5 of the first planetary gear unit 5 is rotated together with the carrier C6 of the second planetary gear unit 6. In this situation, the carrier C5 of the first planetary gear unit 5 is rotated at a speed governed by a rotational speed of the sun gear S5, a rotational speed of the ring gear R5 and the gear ratio of the first planetary gear unit 5, and the torque of the carrier C5 is delivered to the output member 7. Thus, the rotational speed of the carrier C5 as the output element (i.e., an output speed) is changed depending on engagement conditions of the first clutch CL1 and the second clutch CL2. Specifically, the output speed of the case in which only the first clutch CL1 is in engagement is higher than that of the case in which only the second clutch CL2 is in engagement. That is, a high speed mode is established by engaging only the first clutch CL1, and a low speed mode is established by engaging only the second clutch CL2.

FIG. 2B indicates an operating condition of the power distribution device 3 in the dual-motor mode in which the vehicle V is powered by the first motor 2 and the second motor 4 driven by the electric power supplied from the battery 9. In the dual-motor mode, the brake BK is engaged to halt rotation of the ring gear R5 of the first planetary gear unit 5 or to reduce a rotational speed of the ring gear R5 thereby applying an output torque of the first motor 2 to the carrier C5 to propel the vehicle V. In addition, the first clutch CL1 and the second clutches CL2 are disengaged, and the engine 1 is stopped. In the dual-motor mode, since the first clutch CL1 and the second clutches CL2 are disengaged, the carrier C6 of the second planetary gear unit 6 is allowed to rotate freely without being subjected to the reaction torque. Consequently, the second planetary gear unit 6 is disabled to transmit torque so that the engine 1 is disconnected from the first motor 2 and the carrier C5 of the first planetary gear unit 5.

Thus, in the dual-motor mode, the output torque of the first motor 2 is applied to the sun gear S5 of the first planetary gear unit 5 while restricting rotation of the ring gear R5. Consequently, in the first planetary gear unit 5, the carrier C5 and the output member 7 connected thereto are rotated in the same direction as the sun gear S5 but at a speed lower than that of the sun gear S5 as indicated by the solid diagonal line in FIG. 2B. In this situation, the output torque of the second motor 4 is applied to the output member 7. That is, the vehicle V is powered by both of the first motor 2 and the second motor 4.

Whereas, in the second planetary gear unit 6, the ring gear R6 is stopped together with the engine 1 and the sun gear S6 is rotated by the first motor 2 so that the carrier C6 is rotated in the counter direction as indicated by the dashed-line in FIG. 2B.

Figure 3:
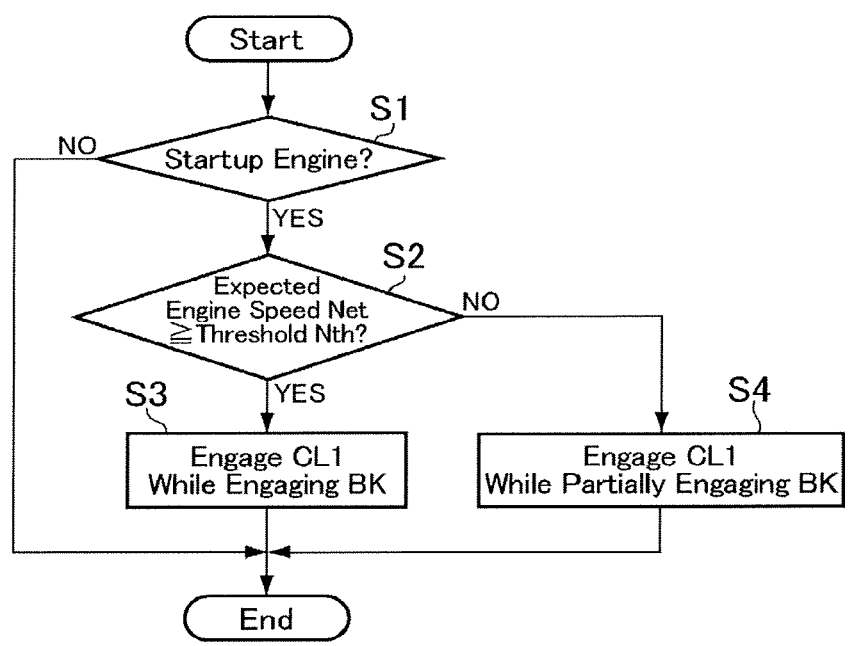
FIG. 3 is a flowchart showing an example of a routine to startup the engine.

The dual-motor mode is selected when a required drive force is small. To this end, the ECU 11 is configured to select the operating mode of the vehicle V based on a depression of the accelerator pedal and a vehicle speed with reference to the preinstalled maps. When the accelerator pedal is depressed in the dual-motor mode to accelerate the vehicle Ve, the engine 1 is started to shift the operating mode to the HV mode so as to achieve the required drive force. Turning to FIG. 3, there is shown an example of a routine to start the engine 1 in the dual-motor mode.

First of all, it is determined at step S1 whether or not a start condition of the engine 1 is satisfied. Specifically, such determination at step S1 may be made with reference to the above-mentioned map determining the operating mode based on a depression of the accelerator pedal and a vehicle speed. If the condition to startup the engine 1 is not currently satisfied so that the answer of step S1 is NO, the routine is returned. By contrast, if the condition to startup the engine 1 is satisfied so that the answer of step S1 is YES, the routine progresses to step S2 to determine whether or not an expected engine speed $N_{et}$ to be achieved by engaging the first clutch CL1 or the second clutch CL2 is equal to or higher than a predetermined threshold value $N_{th}$.

In FIG. 2B, the expected engine speed $N_{et}$ is indicated at an intersection between: the solid diagonal line connecting a point indicating a rotational speed of the unit of the sun gear S5 and the sun gear S6 on the vertical line representing the sun gear S5 and the sun gear S6, and the zero point on the vertical line representing the ring gear R5; and the vertical line representing the ring gear R6 connected to the engine 3. Specifically, the expected engine speed $N_{et}$ corresponds to an expected rotational speed of the ring gear R6 of a case in which the carrier C5 is connected to the carrier C6 by engaging the first clutch CL1, or a case in which the ring gear R5 is connected to the carrier C6 by engaging the second clutch CL2. That is, the expected engine speed $N_{et}$ may be calculated based on a rotational speed of the first motor 2 connected to the ring gear R5 and gear ratios of the first planetary gear unit 5 and the second planetary gear unit 6. Alternatively, the expected engine speed $N_{et}$ may also be calculated based on a rotational speed of the carrier C5 and gear ratios of the first planetary gear unit 5 and the second planetary gear unit 6. Accordingly, the determination at step S2 may also be made by comparing a current rotational speed of the first motor 2 to a predetermined threshold value thereof, or by comparing a current vehicle speed to a predetermined threshold value thereof. Thus, the determination at step S2 may also be made based on rotational speeds of the ring gear R6, the first motor 2, the sun gear S5, the carrier C5 and the output member 7, and a vehicle speed.

For example, the threshold value $N_{th}$ may be set to a lower limit speed of the engine 1 to bring the engine 1 into a self-sustaining condition by igniting the engine. Specifically, the threshold value $N_{th}$ may be set to an ignition speed of the engine 1, or a self-sustaining speed of the engine 1.

If the expected engine speed $N_{et}$ is equal to or higher than the threshold value $N_{th}$ so that the answer of step S2 is YES, the routine progresses to step S3 to engage the first clutch CL1 or the second clutch CL2 by gradually increasing a torque transmitting capacity thereof while engaging the brake BK to halt or restrict rotation of the ring gear R5, and then returned. In this situation, a rotational speed of the carrier C6 rotating in the counter direction is increased in the forward direction toward a rotational speed of the carrier C5 by engaging the first clutch CL1 or the second clutch CL2. Specifically, as indicated on the vertical line representing the carrier C6 in FIG. 2B, the rotational speed of the carrier C6 is increased from the dashed line to the solid line. Consequently, the engine 1 stopping together with the ring gear R6 is rotated in the forward direction so that a rotational speed $N_e$ of the engine 1 is increased to the expected engine speed $N_{et}$.

Thus, as indicated by the solid diagonal in FIG. 2B, the rotational speeds of the ring gear R6 and the carrier C6 are increased in the forward direction by increasing a rotational speed of the first motor 2 in the forward direction while halting rotation of the ring gear R5 by the brake BK. In this situation, the drive torque is increased in accordance with the fixed gear ratios of the first planetary gear unit 5 and the second planetary gear unit 6. That is, the engine 1 can be started by the first motor 2 without reducing a torque amplification factor of the output torque of the first motor 2. For this reason, the engine 1 can be started to shift the operating mode to the HV mode without changing acceleration of the vehicle unintentionally.

In order to thus starting the engine 1, the clutch to be engaged may be selected from the first clutch CL1 and the second clutch CL2 depending on the current vehicle speed and the required drive force. For example, if the current vehicle speed is lower than a predetermined criterion speed, the first clutch CL1 is engaged to start the engine 1 in the low speed mode. By contrast, if the current vehicle speed is higher than the criterion speed, the second clutch CL2 is engaged to start the engine 1 in the high speed mode. For this reason, frequency of engaging and disengaging the first clutch CL1 and the second clutch CL2 can be reduced. Here, the torque applied to the second clutch CL2 to raise the engine speed to the expected engine speed $N_{et}$ is smaller than that applied to the first clutch CL1 for the same purpose. Therefore, it is preferable to engage the second clutch CL2 to limit damage and to reduce hydraulic pressure applied thereto.

When the engine speed $N_e$ is raised to the expected engine speed $N_{et}$ by the first motor 2, fuel is supplied to the engine 1 and the engine 1 is ignited. Consequently, the engine 1 starts running at a speed higher than the self-sustaining speed, that is, startup of the engine 1 is completed. During motoring the engine 1 by the first motor 2, the brake BK establishes a reaction torque. For this reason, the output torque of the first motor 2 will not be applied to the carrier C5 as the output element in a direction to reduce the forward rotational speed, and hence a drop in the drive torque and an occurrence of shocks can be prevented. In addition, it is preferable to increase the output torque of the first motor 2 to rotate the engine 1 without causing a torque drop.

By contrast, if the expected engine speed $N_{et}$ is lower than the threshold value $N_{th}$ so that the answer of step S2 is NO, the routine progresses to step S4 to adjust the expected engine speed $N_{et}$ to the ignition speed or the self-sustaining speed of the engine 1, and to engage the first clutch CL1. At step S4, specifically, the rotational speed of the first motor 2 is increased in the forward direction in such a manner as to raise the engine speed $N_e$ to the expected engine speed $N_{et}$ thus adjusted by engaging the first clutch CL1 while reducing a torque transmitting capacity of the brake BK, that is, while bringing the brake BK into partial engagement. As a result of thus reducing the torque transmitting capacity of the brake BK, the ring gear R5 starts rotating slightly in the counter direction, but the carrier C5 establishes a reaction torque against the output torque of the first motor 2 thus increased. Consequently, in FIG. 2B, an inclination of the solid diagonal line is increased as indicated by a dashed-dotted diagonal line.

In this case, as indicated by the dashed-dotted diagonal line in FIG. 2B, the rotational speed of the first motor 2 is increased in the forward direction while bringing the brake BK into partial engagement. In this situation, the first clutch CL1 is gradually engaged so that the rotational speed of the carrier C6 is increased to the rotational speed of the carrier C5, and consequently the engine speed $N_e$ is raised to the adjusted expected engine speed $N_{et}$. That is, the startup of the engine 1 is completed. In this case, since the rotational speed of the engine 1 is raised to the adjusted expected engine speed $N_{et}$ at which the engine 1 can be started by engaging the first clutch CL1, the engine 1 can be started certainly even if the vehicle V is propelled at a low speed in the dual-motor mode.

As described, in a case of thus bringing the brake BK into partial engagement, the carrier C5 as the output element establishes the reaction torque against the output torque of the first motor 2. In this situation, a drop in the drive force can be prevented by generating torque by the second motor 4.

In this example, if the expected engine speed $N_{et}$ is lower than the threshold value $N_{th}$, the engine speed $N_e$ is raised to the adjusted expected engine speed $N_{et}$ by increasing the rotational speed of the first motor 2 in the forward direction while bringing the brake BK into partial engagement to restrict the rotational speed of the ring gear R5. However, if the first motor 2 can generate torque sufficiently, the engine speed $N_e$ can be raised to the ignition speed or the self-sustaining speed without bringing the brake BK into partial engagement. In this case, therefore, the above-explained routine may be modified to raise the engine speed $N_e$ by the first motor 2 without comparing the expected engine speed $N_{et}$ to the threshold value $N_{th}$.

Figure 4:
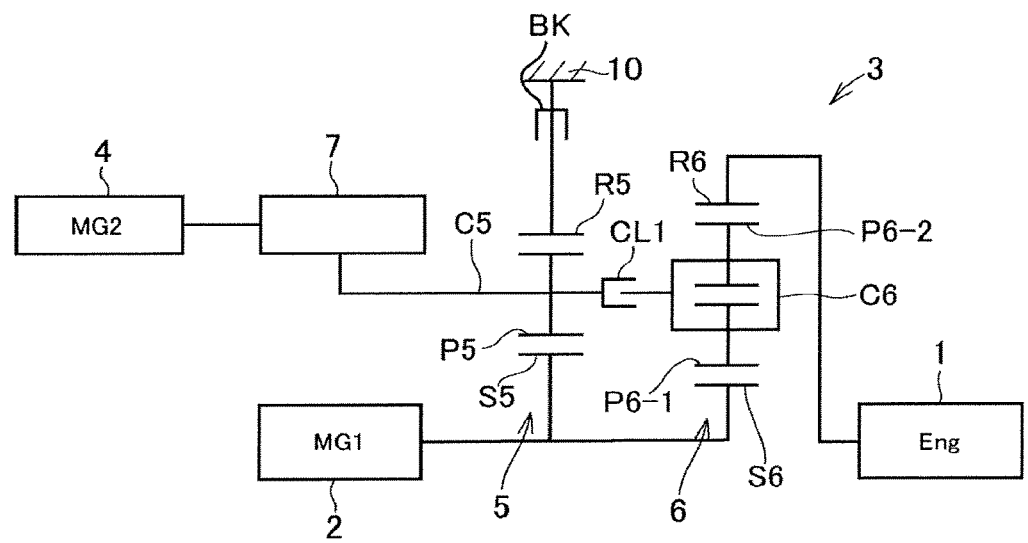
FIG. 4 is a second example of the powertrain of the hybrid vehicle to which the control system according to the embodiment is applied.

Next, the second example of the powertrain of the hybrid vehicle V will be explained with reference to FIG. 4. In FIG. 4, the above-mentioned inverter 8, the battery 9 and the ECU 11 are omitted. Specifically, the powertrain shown in FIG. 4 is not provided with the second clutch CL2, and the remaining structures are similar to that of the powertrain shown in FIG. 1. Therefore, and detailed explanations for the common elements will be omitted by allotting common reference numerals thereto.

Since the powertrain shown in FIG. 4 is not provided with the second clutch CL2, the low speed mode cannot be established in the powertrain shown in FIG. 4. However, the high speed mode may also be established in the HV mode by engaging the first clutch CL1 as indicated in FIG. 2A.

In the dual-motor mode of the powertrain shown in FIG. 4, both of the first motor 2 and the second motor 4 are also operated as motors by the electric power supplied from the battery 9 to propel the vehicle V, while engaging the brake BK and disengaging both of the first clutch CL1 and the second clutch CL2. In this situation, since the brake BK is in engagement and the first motor 2 is rotated in the forward direction to generate drive torque, the first planetary gear unit 5 is operated as indicated by the solid diagonal line in FIG. 2B. On the other hand, since the carrier C6 is allowed to rotate freely, the second planetary gear unit 6 is operated as indicated by the dashed diagonal line in FIG. 2B.

In the dual-motor mode, the engine 1 may also be started by gradually engaging the first clutch CL1 to raise a rotational speed of the carrier C6 of the second planetary gear unit 6 to a rotational speed of the carrier C5 of the first planetary gear unit 5. Consequently, as indicated on the vertical line representing the engine 1 in FIG. 2B, the engine speed $N_e$ is raised from the intersection between the vertical line and the diagonal dashed line to the intersection between the vertical line and the solid diagonal line, that is, to the expected engine speed $N_{et}$.

When the engine speed $N_e$ is raised to the expected engine speed $N_{et}$ by the first motor 2, fuel is supplied to the engine 1 and the engine 1 is ignited. In the powertrain shown in FIG. 4, therefore, a drop in the drive torque and an occurrence of shocks may also be prevented. In addition, it is also preferable to increase the output torque of the first motor 2 to rotate the engine 1 without causing a torque drop. Further, even if the vehicle speed is low during propulsion in the dual-motor mode, the engine 1 may also be started certainly by carrying out step S4 of the routine shown in FIG. 3.

Figure 5:
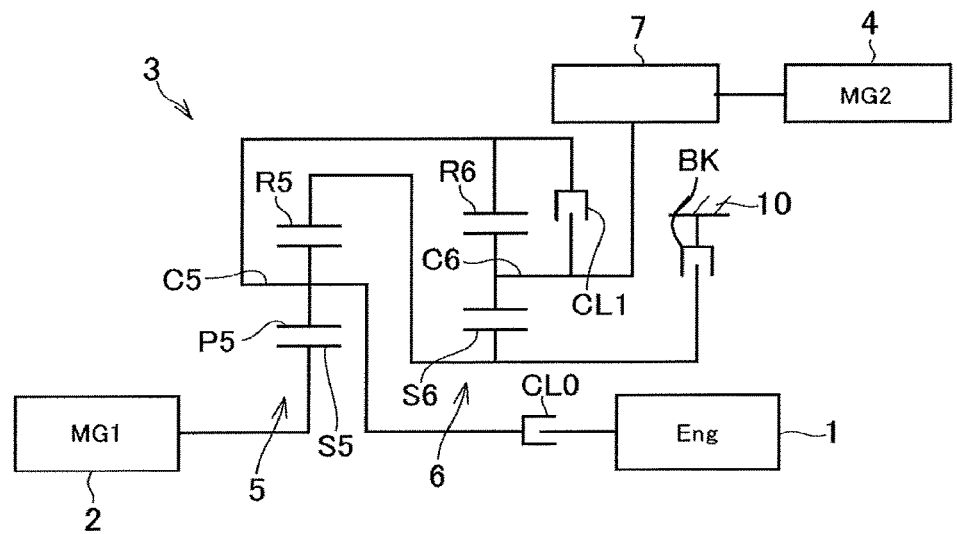
FIG. 5 is a third example of the powertrain of the hybrid vehicle to which the control system according to the embodiment is applied.

Turning to FIG. 5, there is shown the third example of the powertrain of the hybrid vehicle V. In the powertrain shown in FIG. 5, a single-pinion planetary gear unit is also used as the second planetary gear unit 6, and the first planetary gear unit 5 and the second planetary gear unit 6 are arranged coaxially to form the power distribution device 3. Specifically, in the first planetary gear unit 5, the sun gear S5 is connected to the first motor 2 to serve as the reaction element, the carrier C5 is connected to the engine 1 through an input clutch CL0 to serve as the input element, and the ring gear R5 serves as the fixed element that is halted by the brake BK. On the other hand, in the second planetary gear unit 6, the carrier C6 is connected to the output member 7 to serve as the output element 7 to which an output torque of the second motor 4 is applied, the ring gear R6 is connected to the ring gear R5 of the first planetary gear unit 5 as the input element, and the sun gear S6 is connected to the ring gear R5 of the first planetary gear unit 5 to be halted by the brake BK. The remaining structures are similar to that of the powertrain shown in FIG. 1, and the inverter 8, the battery 9 and the ECU 11 are also omitted in FIG. 5. In the powertrain shown in FIG. 5, the ring gear R5 serves as the third rotary element, and the ring gear R6 serves as the fourth rotary element.

Figure 6A:
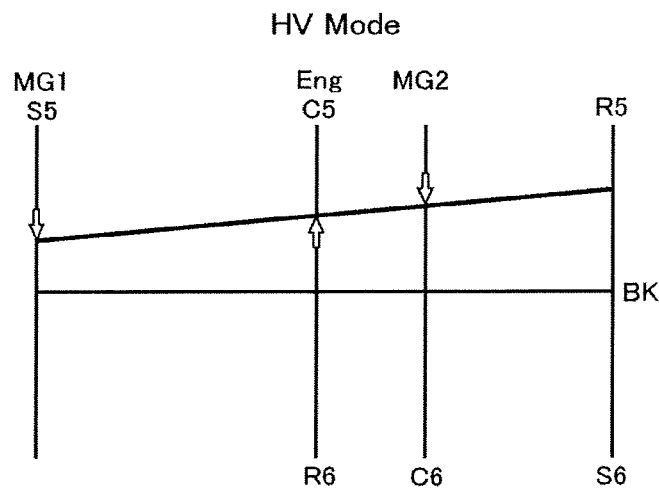
FIGS. 6A and 6B are nomograhic diagrams of the power distribution device of the powertrain shown in FIG. 5.
Figure 6B:
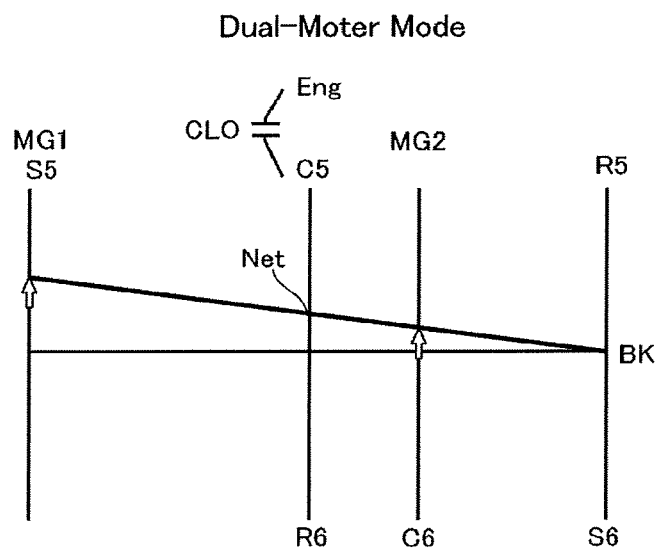

Turning to FIGS. 6A and 6B, there are shown nomographic diagrams of the power distribution device 3 shown in FIG. 5. As indicated in FIG. 6A, in the HV mode, the input clutch CL0 is engaged to connect the engine 1 to the carrier C5 of the first planetary gear unit 5, and the first clutch CL1 and the brake BK are disengaged. In this situation, the engine 1 is operated to propel the vehicle V. In the power distribution device 3 shown in FIG. 5, although connections of the rotary elements are different from those in the foregoing powertrains, positions of the input element, the reaction element, the output element, and fixed element in FIG. 6A are identical to those in FIG. 2A. That is, an operating condition of the power distribution device 3 shown in FIG. 5 in the HV mode is also similar to those of the power distribution devices 3 in the foregoing powertrains as indicated in FIG. 6A.

In the HV mode of the powertrain shown in FIG. 5, the first motor 2 is operated as a generator to generate a negative torque (i.e., a torque in a direction opposite to a rotational direction of the engine 1). An electric power generated by the first motor 2 is supplied to the second motor 4 to operate the second motor 4 to generate a drive torque, and the drive torque generated by the second motor 4 is applied to the output member 7. Specifically, as indicated by arrows in FIG. 6A, the carrier C5 of the first planetary gear unit 5 and the ring gear R6 of the second planetary gear unit 6 connected thereto are rotated in the forward direction by the output torque of the engine 1, and the sun gear S5 of the first planetary gear unit 5 is also rotated in the forward direction while being subjected to the negative torque of the first motor 2. Consequently, the ring gear R5 and the carrier C5 of the first planetary gear unit 5 and the carrier C6 of the second planetary gear unit 6 are rotated in the forward direction by the torques of the engine 1 and the first motor 2. In this situation, a rotational speed of the engine 1 is adjusted to an optimally fuel efficient manner by the first motor 2.

FIG. 6B indicates an operating condition of the power distribution device 3 of the powertrain shown in FIG. 5 in the dual-motor mode in which the vehicle V is powered by the first motor 2 and the second motor 4 driven by the electric power supplied from the battery 9. In the dual-motor mode, the brake BK is engaged to halt rotations of the ring gear R5 of the first planetary gear unit 5 and the sun gear S6 of the second planetary gear unit 6 thereby applying an output torque of the first motor 2 to the carrier C6 of the second planetary gear unit 6 to propel the vehicle V. In this situation, the first clutch CL1 and the second clutches CL2 are disengaged, and the engine 1 is stopped. In the dual-motor mode, since the first clutch CL1 is disengaged, the second planetary gear unit 6 is allowed to serve as a differential mechanism. In addition, the input clutch CL0 is disengaged to disconnect the engine 1 from the first motor 2 and the carrier C5 of the first planetary gear unit 5 as the input element.

Thus, in the dual-motor mode, the output torque of the first motor 2 is applied to the sun gear S5 of the first planetary gear unit 5 while halting the ring gear R5. Consequently, in the first planetary gear unit 5, torque of the carrier C5 is delivered to the ring gear R6 of the second planetary gear unit 6. Whereas, in the second planetary gear unit 6, the ring gear R6 is rotated in the forward direction while halting rotation of the sun gear S6 so that the carrier C6 and the output member 7 connected thereto are rotated in the same direction as the sun gear S5 (or the first motor 2) but at a speed lower than that of the sun gear S5 as indicated by the solid diagonal line in FIG. 6B. In this situation, the output torque of the second motor 4 is applied to the output member 7. That is, the vehicle V is powered by both of the first motor 2 and the second motor 4.

Thus, in the dual-motor mode of the powertrain shown in FIG. 5, the input clutch CL0 is disengaged to disconnect the engine 1 from the power distribution device 3. In this situation, since the carrier C5 of the first planetary gear unit 5 serving as the input element is rotated in the forward direction, the engine 1 can be started by engaging the input clutch CL0 by the procedures shown in FIG. 3.

As described, according to the routine shown in FIG. 3, if the speed of the engine 1 is lower than the threshold value $N_{th}$ during propulsion in the dual-motor mode, the engine speed $N_e$ is raised to the ignition speed or the self-sustaining speed to be started by increasing speed of the first motor 2 while bringing the brake BK into partial engagement. Optionally, in order not to raise the engine speed $N_e$ excessively by the first motor 2 when started, torque transmitting capacities of the brake BK the first clutch CL1 and the input clutch CL0 may be adjusted by carrying out the routines shown in FIGS. 7 and 8.

Figure 7:
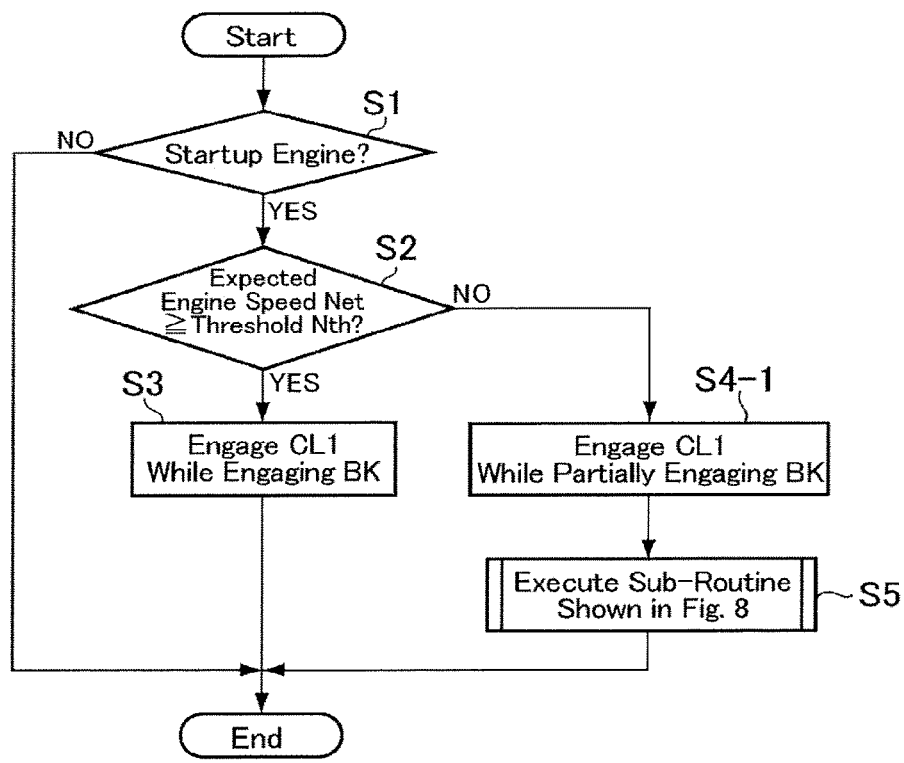
FIG. 7 is a flowchart showing another example of the routine to startup the engine.

As the above-explained routine shown in FIG. 3, the routine shown in FIG. 7 is executed during propulsion in the dual-motor mode to shift the operating mode to the HV mode. If the condition to startup the engine 1 is satisfied so that the answer of step S1 is YES, the routine progresses to step S2 to compare the expected engine speed $N_{et}$ at engagement of the clutch CL1, CL2 or CL0 to the threshold value $N_{th}$. In the following explanation for the routines shown in FIGS. 7 and 8, the clutches CL1, CL2 and CL0 will be temporarily called the "clutch CL" for the sake of explanation. If the expected engine speed $N_{et}$ is equal to or higher than the threshold value $N_{th}$ so that the answer of step S2 is YES, the routine progresses to step S3 to start the engine 1 by engaging the clutch CL by gradually increasing a torque transmitting capacity thereof while engaging the brake BK, and then returned.

By contrast, if the expected engine speed $N_{et}$ is lower than the threshold value $N_{th}$ so that the answer of step S2 is NO, the routine progresses to step S4-1 to adjust the expected engine speed $N_{et}$ to the ignition speed or the self-sustaining speed of the engine 1, and to start the engine 1 by gradually engaging the clutch CL while bringing the brake BK into partial engagement and while increasing speed of the first motor 2 in the forward direction. Consequently, the engine speed $N_e$ is raised to the adjusted expected engine speed $N_{et}$.

Figure 8:
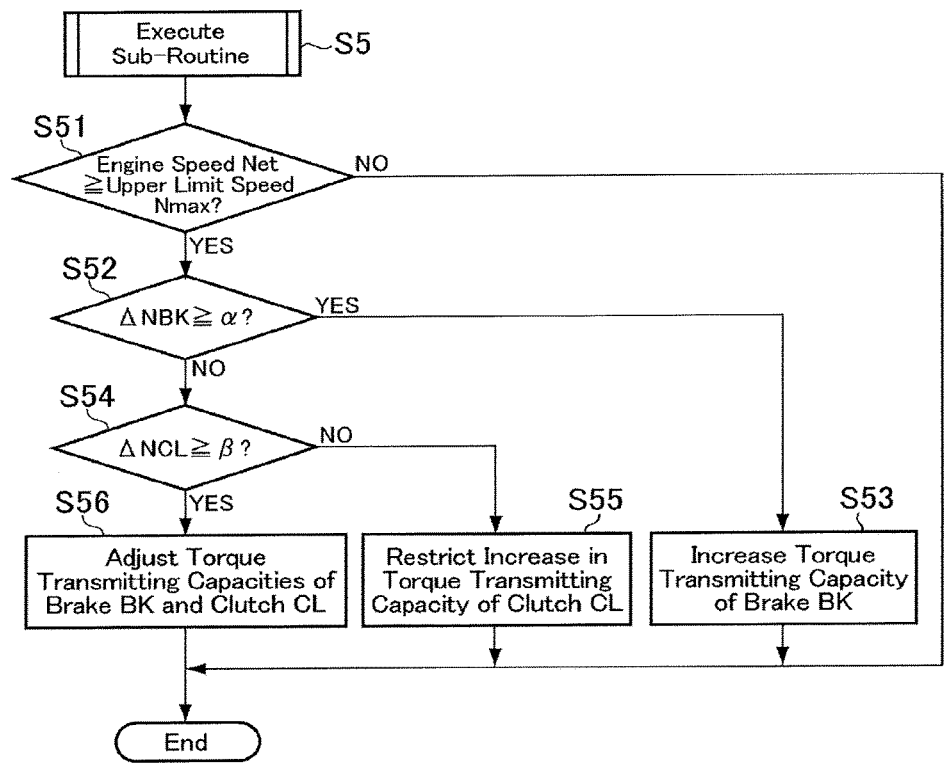
FIG. 8 is a showing a subroutine of the routine shown in FIG. 7.

Then, in order not to raise the engine speed $N_e$ excessively, the routine progresses to step S5 to execute a sub-routine shown in FIG. 8. In the sub-routine shown in FIG. 8, first of all, the actual engine speed $N_e$ is compared at step S51 to an upper limit speed $N_{max}$ of a motoring speed of the engine 1. Here, the upper limit speed $N_{max}$ may be altered in accordance with specifications of the vehicle V.

If the engine speed $N_e$ is lower than the upper limit speed $N_{max}$ so that the answer of step S51 is NO, the sub-routine is terminated without carrying out any specific control. By contrast, if the engine speed $N_e$ is higher than the upper limit speed $N_{max}$ so that the answer of step S51 is YES, the routine progresses to step S52 to determine whether or not a speed difference $\Delta N_{BK}$ between rotary members of the brake BK being frictionally engaged while causing slip is equal to or greater than a first reference value $\alpha$. Specifically, the first reference value $\alpha$ as a first allowable value is an upper limit value of the speed difference $\Delta N_{BK}$ between rotary members of the brake BK that is determined taking account of durability and heat generation of the brake BK.

If the speed difference $\Delta N_{BK}$ of the brake BK is equal to or greater than the first reference value $\alpha$ so that the answer of step S52 is YES, this means that the rotary members of the of the brake BK are slipping excessively and hence a rotational speed of the fixed element may be increased in the counter direction to increase the engine speed $N_e$ higher than the threshold value $N_{th}$. In this case, therefore, the routine progresses to step S53 to increase a torque transmitting capacity of the brake BK, and then the routine is terminated.

By contrast, if the speed difference $\Delta N_{BK}$ of the brake BK is smaller than the first reference value $\alpha$ so that the answer of step S52 is NO, the routine progresses to step S54 to determine whether or not a speed difference $\Delta N_{CL}$ between an input member and an output member of the clutch CL being frictionally engaged while causing slip is equal to or greater than a second reference value $\beta$. The second reference value $\beta$ as a second allowable value of the speed difference $\Delta N_{CL}$ may also be determined taking account of durability and heat generation of the clutch CL.

If the speed difference $\Delta N_{CL}$ of the clutch CL is smaller than the second reference value $\beta$ so that the answer of step S54 is NO, the routine progresses to step S55 to restrict an increase in the torque transmitting capacity of the clutch CL, and then the routine is terminated. As described, the engine speed $N_e$ is raised by engaging the clutches CL such as the first clutch CL1, the second clutch CL2 and the input clutch CL0. That is, the motoring torque for raising the engine speed $N_e$ is reduced by reducing the torque transmitting capacity of the clutch device CL. At step S55, therefore, the engine speed $N_e$ is prevented from being raised excessively by restricting increase in the torque transmitting capacity of the clutch device CL or by reducing the torque transmitting capacity of the clutch device CL. For this reason, even if the expected engine speed $N_{et}$ has been adjusted to the higher value, the engine 1 is ignited before the engine speed $N_e$ is raised to the expected engine speed $N_{et}$ to prevent an excessive rise in the engine speed $N_e$.

By contrast, if the speed difference $\Delta N_{CL}$ of the clutch CL is equal to or greater than the second reference value $\beta$ so that the answer of step S54 is YES, this means that the engine speed $N_e$ is raised to be higher than the threshold value $N_{th}$ while keeping the speed difference $\Delta N_{BK}$ of the brake BK within the first reference value $\alpha$ but the speed difference $\Delta N_{CL}$ of the clutch CL is greater than the second reference value $\beta$. In this case, therefore, the routine progresses to step S56 to alter (e.g., to reduce) the torque transmitting capacity of the brake BK and to alter (e.g., to reduce) the torque transmitting capacity of the clutch CL, and then the routine is terminated. Consequently, the engine speed $N_e$ is lowered by the reaction force resulting from raising the engine speed $N_e$ by the clutch CL. In this situation, the engine speed $N_e$ is further lowered by reducing the torque transmitting capacity of the brake BK while reducing toe torque transmitting capacity of the clutch CL. For this reason, an excessive slip of the clutch CL and an excessive rise in the engine speed $N_e$ by the first motor 2 can be prevented.

Figure 9:
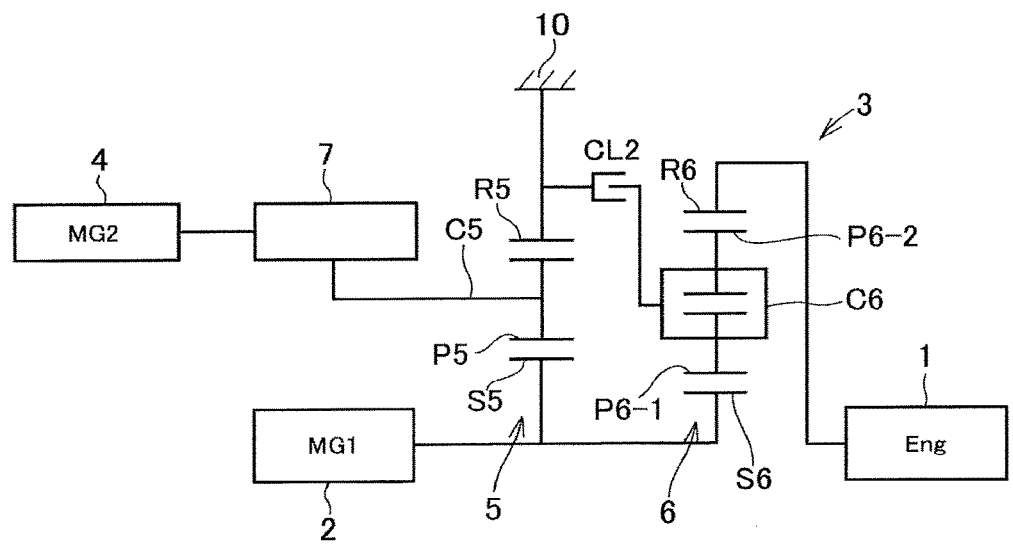
FIG. 9 is a fourth example of the powertrain of the hybrid vehicle to which the control system according to the embodiment is applied.

Thus, in each of the nomographic diagrams of the power distribution device 3 according to the foregoing examples, the fixed element establishing the reaction force against the torque of the first motor 2 for starting the engine 1 is situated on the other side of the sing gear S5 and the sun gear S6 connected to the first motor 1 across the output element and the input element. That is, the reaction element and the fixed element of the power distribution device 3 are situated on both ends of the nomographic diagram. According to the foregoing examples, therefore, the drive torque will not be reduced by the output torque of the first motor 1 to rotate the crankshaft of the engine 1 thereby preventing a temporal drop in the drive torque during cranking of the engine 1. To this end, rotation of the fixed element may also be halted by directly fixing to a stationary member as illustrated in FIG. 9.

In the fourth example of the powertrain of the vehicle V, the first clutch Cl1 and the brake BK are eliminated from the first example shown in FIG. 1, and the ring gear R5 of the first planetary gear unit 5 is fixed directly to the casing 10. In FIG. 9, the inverter 8, the battery 9 and the ECU 11 are also omitted for the sake of illustration. In the fourth example, the carrier C6 of the second planetary gear unit 6 serves as the first rotary element, the sun gear S6 of the second planetary gear unit 6 serves as the second rotary element, and the ring gear R6 of the second planetary gear unit 6 serves as the input element.

Figure 10:
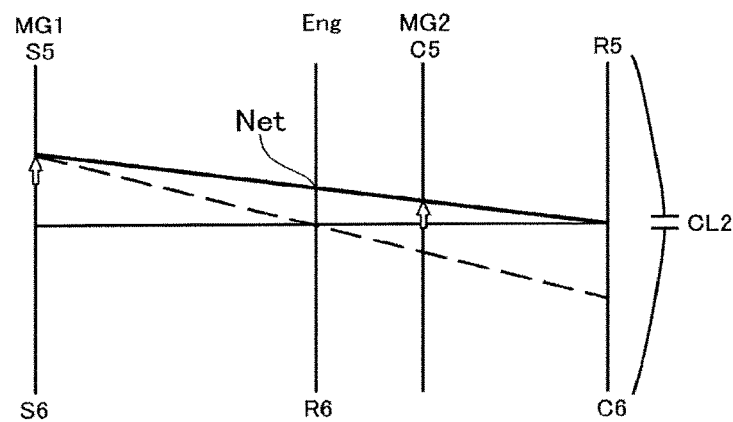
FIG. 10 is a nomographic diagram the power distribution device of the powertrain shown in FIG. 9.

FIG. 10 shows a nomographic diagram of the distribution device 3 according to the fourth example. In FIG. 10, the solid diagonal line indicates rotational speeds of the rotary elements of the power distribution device 3 in the HV mode in which the second clutch CL2 is in engagement, and the dashed diagonal line indicates rotational speeds of the rotary elements of the power distribution device 3 in the HV mode in which the second clutch CL2 is in disengagement and the engine 1 is stopped. In the HV mode, the carrier C5 as the output element is rotated in the forward direction to propel the vehicle V in the forward direction by generating the forward torque by any of the engine 1, the first motor 2 and the second motor 4. In the HV mode, any of the first motor 2 and the second motor 4 may be used as a motor to power the vehicle V, and the other motor may be operated as a generator to operate the motor generating a drive torque.

By contrast, the dual-motor mode is established by disengaging the second clutch CL2. In the dual-motor mode, the carrier C6 is released from the reaction torque and allowed to rotate freely. Consequently, the engine 1 is disconnected from the first motor 2 and a differential action of the second planetary gear unit 6 is terminated. In this situation, therefore, the first planetary gear unit 5 serves as a speed reducer to multiply an output torque of the first motor 2, and the multiplied torque is delivered from the carrier 5 to the output member 7. In the dual-motor mode, an output torque of the second motor 4 is also applied to the output member 7.

As indicated by the dashed diagonal line in FIG. 10, in the dual-motor mode, the sun gear S6 is rotated in the forward direction by the first motor 2, the ring gear R6 connected to the engine 1 is stopped, and the carrier C6 is released from the reaction torque and rotated in the counter direction. In this situation, the engine 1 can be started by gradually engaging the second clutch CL2. Consequently, the rotational speeds or the rotary elements of the power distribution device 3 are gradually changed from the speeds indicated by the dashed diagonal line to the speeds indicated by the solid diagonal line. Specifically, the actual engine speed $N_e$ is raised to the expected engine speed $N_{et}$ so that the engine 1 is started. In this case, the first motor 2 also generates torque for starting the engine 1, and the ring gear R5 as the fixed element establishes a reaction force. For this reason, the carrier C5 of the first planetary gear unit 5 can be prevented from being subjected to the reaction torque and hence temporal drop in the drive force and occurrence of shocks can be prevented.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A control system for a hybrid vehicle comprising an engine, a first motor, a power distribution device connected to the engine and the first motor, an output member to which torque is delivered from the power distribution device, and a second motor connected to the output member, wherein
the power distribution device includes a combined planetary gear unit formed by combining a first planetary gear unit and a second planetary gear unit,
a rotary element of the combined planetary gear unit includes a reaction element connected to the first motor, a fixed element whose rotation is selectively restricted, an input element connected to the engine, and an output element connected to the output member,
the combined planetary gear unit is configured in such a manner that the reaction element is rotated at a speed higher than speeds of the input element and the output element when rotation of the fixed element is restricted, and that the fixed element is rotated at a speed higher than speed of the input element and the output element when the fixed element is allowed to rotate and the reaction element is rotated at a speed lower than the speeds of the input element and the output element, and
a clutch is disposed between any of the rotary elements or between the input element and the engine to selectively transmitting torque between the first motor and the engine,
the control system comprising:
a controller for controlling startup of the engine that is configured to start the stopping engine by operating the first motor to generate torque for rotating the engine while restricting rotation of the fixed element and increasing a torque transmitting capacity of the clutch.

2. The control system for a hybrid vehicle as claimed in claim 1,
wherein the hybrid vehicle further comprises a brake that selectively restricts rotation of the fixed element, and
wherein the controller is further configured to restrict rotation of the fixed element by the brake when starting the engine.

3. The control system for a hybrid vehicle as claimed in claim 1, wherein
the hybrid vehicle further comprises a casing holding the combined planetary gear unit,
the first planetary gear unit comprises the reaction element, the output element, and the fixed element,
the second planetary gear unit comprises the input element, a first rotary element, and a second rotary element connected to the reaction element,
the fixed element is connected to the casing in such a manner as to restrict rotation of the fixed element, and
the clutch is disposed between the first rotary element and the fixed element.

4. The control system for a hybrid vehicle as claimed in claim 2, wherein
the first planetary gear unit comprises the reaction element, the output element, and the fixed element,
the second planetary gear unit comprises the input element, a first rotary element, and a second rotary element connected to the reaction element, and
the clutch is disposed between the first rotary element and the output element.

5. The control system for a hybrid vehicle as claimed in claim 1, wherein
the first planetary gear unit comprises the reaction element, the input element, and a third rotary element,
the second planetary gear unit comprises the fixed element, the output element, and a fourth rotary element,
the third rotary element is connected to the fixed element, and the fourth rotary element is connected to the input element, and
the clutch is disposed between the input element and the engine.

6. The control system for a hybrid vehicle as claimed in claim 2, wherein the controller is further configured to:
   determine whether or not an expected engine speed to be achieved by engaging the clutch is higher than a threshold value;
   start the engine by a torque of the first motor while engaging the clutch and halting rotation of the fixed element in a case that the expected engine speed is higher than the threshold value; and
   start the engine by a torque of the first motor while reducing a torque transmitting capacity of the brake to allow the fixed element to rotate in a counter direction to a rotational direction of the reaction element and engaging the clutch, in a case that the expected engine speed is lower than the threshold value.

7. The control system for a hybrid vehicle as claimed in claim 6, wherein the controller is further configured to adjust the expected engine speed by increasing a rotational speed of the reaction element by the first motor, in a case of allowing the fixed element to rotate in the counter direction to the rotational direction of the reaction element by reducing the torque transmitting capacity of the brake.

8. The control system for a hybrid vehicle as claimed in claim 6, wherein the controller is further configured to execute at least any one of a control to increase the torque transmitting capacity of the brake and a control to restrict an increase in a torque transmitting capacity of the clutch, in a case that the expected engine speed is raised to be higher than an upper limit value by reducing the torque transmitting capacity of the brake.

9. The control system for a hybrid vehicle as claimed in claim 8, wherein the controller is further configured to:
   increase the torque transmitting capacity of the brake in a case that a speed difference between rotary members of the brake is equal to or greater than a first allowable value; and
   restrict the torque transmitting capacity of the clutch in a case that a speed difference between rotary members of the clutch is smaller than a second allowable value.

10. The control system for a hybrid vehicle as claimed in claim 9, wherein the controller is further configured to adjust both of the torque transmitting capacities of the brake and the clutch in a case that the speed difference between rotary members of the brake is equal to or greater than the first allowable value and speed difference between rotary members of the clutch is greater than the second allowable value.

11. The control system for a hybrid vehicle as claimed in claim 4, wherein the controller is further configured to:
   determine whether or not an expected engine speed to be achieved by engaging the clutch is higher than a threshold value;
   start the engine by a torque of the first motor while engaging the clutch and halting rotation of the fixed element in a case that the expected engine speed is higher than the threshold value; and
   start the engine by a torque of the first motor while reducing a torque transmitting capacity of the brake to allow the fixed element to rotate in a counter direction to a rotational direction of the reaction element and engaging the clutch, in a case that the expected engine speed is lower than the threshold value.

* * * * *